(12) United States Patent
Shaw et al.

(10) Patent No.: US 10,129,867 B2
(45) Date of Patent: Nov. 13, 2018

(54) UNIVERSAL PEER-TO-PEER SIGNALING NETWORK VIRTUALIZATION AND ORCHESTRATION

(71) Applicant: AT&T Intellectual Property I, L.P., Atlanta, GA (US)

(72) Inventors: Venson Shaw, Kirkland, WA (US); Rajendra Prasad Kodaypak, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 118 days.

(21) Appl. No.: 15/143,401

(22) Filed: Apr. 29, 2016

(65) Prior Publication Data

US 2017/0318570 A1  Nov. 2, 2017

(51) Int. Cl.
*H04W 72/04* (2009.01)
*H04L 5/00* (2006.01)

(52) U.S. Cl.
CPC ......... *H04W 72/044* (2013.01); *H04L 5/0053* (2013.01)

(58) Field of Classification Search
CPC .................................................. H04W 72/044
See application file for complete search history.

(56) References Cited

U.S. PATENT DOCUMENTS

| | | | | |
|---|---|---|---|---|
| 6,954,790 B2* | 10/2005 | Forslow | ............. | H04L 63/0227 455/461 |
| 8,325,732 B2* | 12/2012 | Casey | ................. | H04L 12/4658 370/395.2 |
| 8,559,363 B2* | 10/2013 | Casey | ................. | H04L 12/4658 370/327 |
| 8,615,237 B2 | 12/2013 | Baniel et al. | | |
| 8,675,659 B2* | 3/2014 | McNamee | ............ | H04L 45/742 370/392 |
| 8,725,820 B2* | 5/2014 | McNamee | .............. | H04L 69/40 709/206 |

(Continued)

OTHER PUBLICATIONS

"Dialogic® Helix™ Signaling Controller," Datasheet, Aug. 2015, Dialogic Corporation.

(Continued)

*Primary Examiner* — Gregory B Sefcheck
(74) *Attorney, Agent, or Firm* — Hartman & Citrin LLC

(57) ABSTRACT

Concepts and technologies disclosed herein are directed to universal peer-to-peer signaling network virtualization and orchestration. According to one aspect of the concepts and technologies disclosed herein, a universal DIAMETER orchestrator can determine DIAMETER peer nodes to be utilized to handle DIAMETER signaling traffic for a service. The universal DIAMETER orchestrator can allocate transport resources over which a transport connection between the DIAMETER peer nodes can be established. In some embodiments, the universal DIAMETER orchestrator can allocate the transport resources on-demand. The universal DIAMETER orchestrator can allocate DIAMETER resources to provision DIAMETER signaling interfaces to handle the DIAMETER signaling traffic between the DIAMETER peer nodes. In some embodiments, the universal DIAMETER orchestrator can allocate the DIAMETER resources in accordance with a rule to override a traditional DIAMETER routing agent.

20 Claims, 8 Drawing Sheets

(56) References Cited

U.S. PATENT DOCUMENTS

| | | | |
|---|---|---|---|
| 8,725,896 B2* | 5/2014 | McNamee | H04L 45/24 |
| | | | 709/238 |
| 8,750,825 B2 | 6/2014 | Patterson et al. | |
| 8,793,396 B2 | 7/2014 | Zhou et al. | |
| 8,799,391 B2* | 8/2014 | Craig | H04L 63/0892 |
| | | | 370/352 |
| 8,824,370 B2* | 9/2014 | McNamee | H04L 45/306 |
| | | | 370/328 |
| 8,831,016 B2 | 9/2014 | Wallace et al. | |
| 8,880,726 B2* | 11/2014 | McNamee | H04L 41/12 |
| | | | 709/217 |
| 8,943,221 B2* | 1/2015 | McNamee | H04L 45/42 |
| | | | 709/217 |
| 8,954,080 B2 | 2/2015 | Janakiraman et al. | |
| 9,112,869 B2* | 8/2015 | Casey | H04L 12/4658 |
| 9,288,276 B2* | 3/2016 | Adamczyk | H04L 51/043 |
| 9,298,515 B2* | 3/2016 | McMurry | H04L 67/1031 |
| 9,301,191 B2* | 3/2016 | Sachdev | H04L 41/5019 |
| 9,306,891 B2* | 4/2016 | McNamee | H04L 45/42 |
| 9,313,004 B2* | 4/2016 | Yanover | H04L 5/0053 |
| 9,369,390 B2* | 6/2016 | Bantukul | H04L 47/127 |
| 9,380,460 B2* | 6/2016 | Stenfelt | H04L 63/08 |
| 9,398,492 B2* | 7/2016 | Deo | H04W 28/16 |
| 9,439,129 B2* | 9/2016 | McNamee | H04L 45/42 |
| 9,490,953 B2* | 11/2016 | Yanover | H04L 5/0053 |
| 9,582,306 B2* | 2/2017 | Dowlatkhah | G06F 9/45537 |
| 9,680,924 B2* | 6/2017 | Kodaypak | H04L 67/101 |
| 9,693,366 B2* | 6/2017 | Adjakple | H04W 12/08 |
| 9,706,391 B2* | 7/2017 | Seenappa | H04W 8/14 |
| 9,712,634 B2* | 7/2017 | Ang | H04L 67/2823 |
| 2013/0311629 A1 | 11/2013 | Chastain | |
| 2014/0233389 A1* | 8/2014 | Bantukul | H04L 47/127 |
| | | | 370/236 |
| 2014/0233430 A1 | 8/2014 | Russell | |
| 2014/0237111 A1 | 8/2014 | McMurry et al. | |
| 2014/0297888 A1 | 10/2014 | McCann | |
| 2014/0376380 A1 | 12/2014 | Campbell et al. | |
| 2015/0036504 A1 | 2/2015 | McMurry et al. | |
| 2015/0085663 A1 | 3/2015 | McMurry et al. | |
| 2015/0103647 A1 | 4/2015 | Batz et al. | |
| 2016/0007138 A1* | 1/2016 | Palanisamy | H04W 4/70 |
| | | | 455/41.2 |
| 2017/0142206 A1* | 5/2017 | Kodaypak | H04L 12/1407 |
| 2017/0244629 A1* | 8/2017 | Kodaypak | H04L 45/22 |

OTHER PUBLICATIONS

Prince, David, "Diameter Signalling Router," Dec. 2, 2010, Tekelec.

"Oracle Communications Diameter Signaling Router," Oracle Data Sheet, 2015, Oracle Communications.

"The New Diameter Network: Managing the Signaling Storm," An Oracle White Paper, Dec. 2013, Oracle Communications.

"The ThinkingNetworks™ Revolution," Mar. 2013, Tekelec.

* cited by examiner

UNIVERSAL PEER-TO-PEER SIGNALING NETWORK VIRTUALIZATION AND ORCHESTRATION

BACKGROUND

The signaling network is of vital importance to network service providers. This is because the signaling network directs signaling traffic from source to destination leveraging Third Generation Partnership Project ("3GPP") standard protocols, such as DIAMETER and RADIUS. DIAMETER protocol is an authentication, authorization, and accounting ("AAA") protocol that works at the application layer of the Open Systems Interconnection ("OSI") model. DIAMETER supersedes RADIUS and provides several new features, including application layer acknowledgement, capability negotiation, and extensibility to add new features. DIAMETER is a message-based protocol, whereby end points exchange messages and receive positive or negative acknowledgements. DIAMETER protocol is well-documented in technical specifications such as those available from the Internet Engineering Task Force ("IETF"), particularly Request for Comments ("RFC") 6733 and related documents.

Protecting and maintaining the signaling network is critical to avoid network outages and to promptly deliver a wide range of revenue generating services, including, for example, video, social network, social media, Voice over Long-Term Evolution ("VoLTE"), e-commerce, multimedia, and messaging. The signaling network must operate properly and must not become overloaded to avoid network outages. When the signaling network becomes overloaded, a registration storm can be triggered and cause both the signaling network and the bearer network to stop functioning or to function at a reduced capacity.

SUMMARY

Concepts and technologies disclosed herein are directed to universal peer-to-peer signaling network virtualization and orchestration. According to one aspect of the concepts and technologies disclosed herein, a universal DIAMETER orchestrator can determine DIAMETER peer nodes to be utilized to handle DIAMETER signaling traffic for a service. The universal DIAMETER orchestrator can allocate transport resources over which a transport connection between the DIAMETER peer nodes can be established. In some embodiments, the universal DIAMETER orchestrator can allocate the transport resources on-demand. The universal DIAMETER orchestrator can allocate DIAMETER resources to provision DIAMETER signaling interfaces to handle the DIAMETER signaling traffic between the DIAMETER peer nodes. In some embodiments, the universal DIAMETER orchestrator can allocate the DIAMETER resources in accordance with a rule to override a traditional DIAMETER routing agent.

In some embodiments, the universal DIAMETER orchestrator can receive a service request from a user equipment ("UE") device. The service request can specify the service to be provided to the UE device. The universal DIAMETER orchestrator can analyze the service request to identify the service.

In some embodiments, the universal DIAMETER orchestrator can determine one or more DIAMETER applications to be utilized to meet a DIAMETER signaling requirement of the service. In some embodiments, the universal DIAMETER orchestrator can create a structured representation of DIAMETER application data associated with the DIAMETER application(s). The universal DIAMETER orchestrator also can report the structured representation. The structured representation can be formatted in JavaScript Object Notation ("JSON").

In some embodiments, the universal DIAMETER orchestrator can analyze a structured DIAMETER protocol stack at a DIAMETER applicator layer, a transport layer, and an IP layer to ensure that the transport resources are allocated to meet the DIAMETER signaling requirement for the service.

In some embodiments, the universal DIAMETER orchestrator can map the DIAMETER resources available in a network designed to provide the service.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
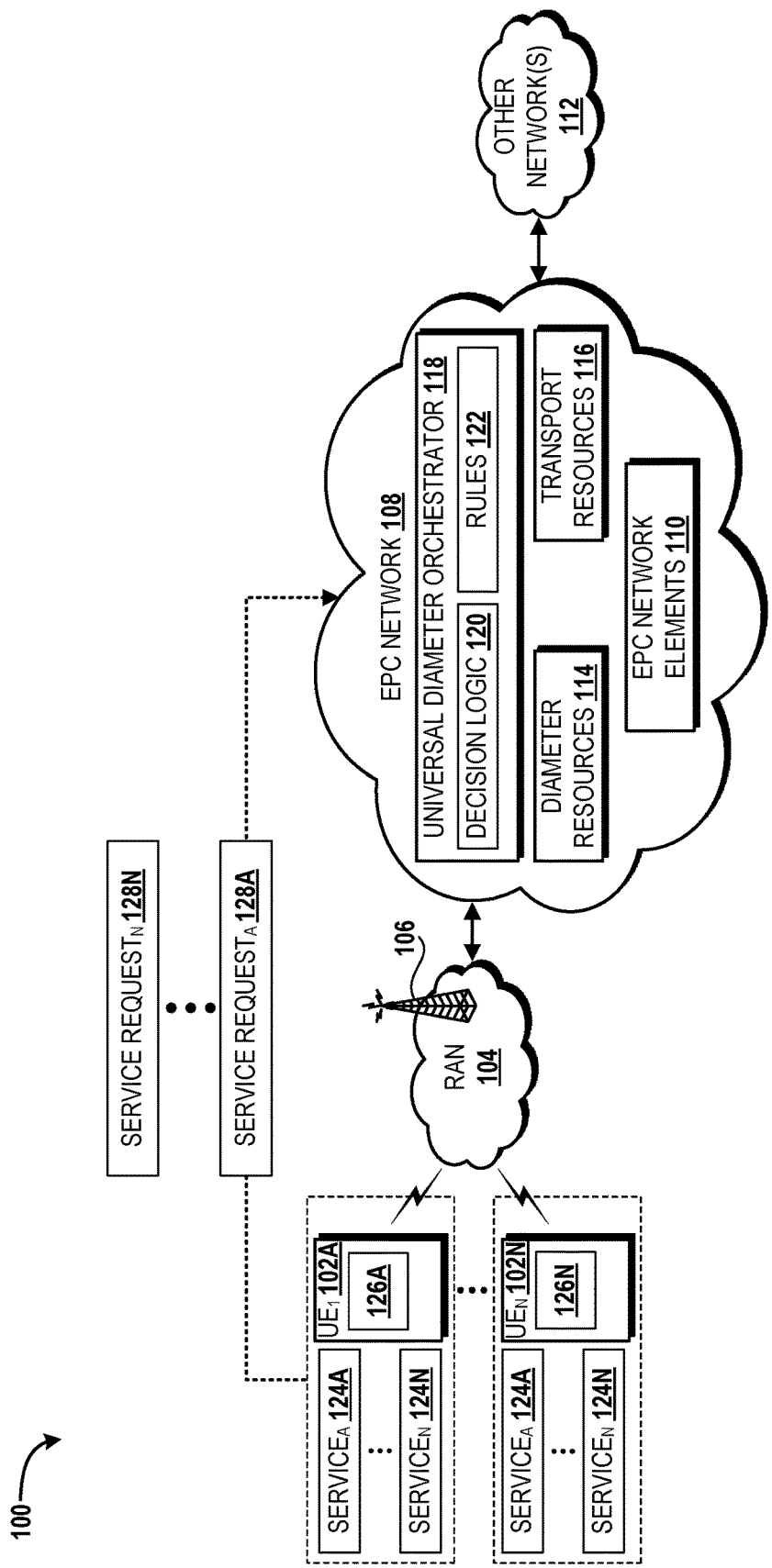
FIG. 1 is a block diagram illustrating a network operating environment in which aspects of the concepts and technologies disclosed herein can be implemented.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of concepts and technologies for universal peer-to-peer signaling network virtualization and orchestration will be described.

Turning now to FIG. 1, a block diagram illustrating an operating environment 100 in which aspects of the concepts and technologies disclosed herein can be implemented. The operating environment 100 includes a plurality of user equipment devices ("UEs") 102A-102N (referred to herein collectively as UEs 102, or in the singular form as UE 102) operating in communication with a radio access network ("RAN") 104. Each of the UEs 102 can be a cellular phone, a feature phone, a smartphone, a mobile computing device, a tablet computing device, a portable television, a portable video game console, or any other device capable of communicating with the RAN 104. The UEs 102 can communicate with the RAN 104 by way of one or more eNodeBs ("eNBs"), such as an eNB 106. Although only a single eNB 106 is shown, the RAN 104 can support multiple eNBs configured the same as or similar to the eNB 106.

The RAN 104 can include one or more service areas ("cells") having the same or different cell sizes, which may be represented by different cell-types. As used herein, a "cell" refers to a geographical area that is served by one or more base stations operating within an access network. The cells within the RAN 104 can include the same or different cell sizes, which may be represented by different cell-types. A cell-type can be associated with certain dimensional characteristics that define the effective radio range of a cell. Cell-types can include, but are not limited to, a macro cell-type, a metro cell-type, a femto cell-type, a pico cell-type, a micro cell-type, wireless local area network ("WLAN") cell-type, and a white space network cell-type. For ease of explanation, a "small cell" cell-type is utilized herein to collectively refer to a group of cell-types that includes femto cell-type, pico cell-type, and micro cell-type, in general contrast to a macro cell-type, which offers a larger coverage area. Other cell-types, including proprietary cell-types and temporary cell-types are also contemplated. Although in the illustrated example, the UEs 102 are shown as being in communication with one RAN (i.e., the RAN 104), the UEs 102 may be in communication with any number of access networks, including networks that incorporate collocated wireless wide area network ("WWAN") WI-FI and cellular technologies, and as such, the UEs 102 can be dual-mode devices.

The RAN 104 can operate in accordance with one or more radio access technologies ("RAT") that utilize mobile telecommunications standards including, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other current 3GPP cellular technologies, other future 3GPP cellular technologies, combinations thereof, and/or the like. The RAN 104 can utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide a radio/air interface to the UEs 102. Data communications can be provided in part by the RAN 104 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN 104 may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like. The concepts and technologies disclosed herein will be described in context of the RAN 104 operating in accordance with LTE, although those skilled in the art will appreciate the applicability of the concepts and technologies disclosed herein to other cellular technologies, including, in particular, those captured within future generation 3GPP standards. Moreover, in some embodiments, the RAN 104 is or includes one or more virtual RANs ("vRANs").

As used herein, a "base station" refers to a radio receiver and/or transmitter (collectively, transceiver) that is/are configured to provide a radio/air interface over which one or more of the UEs 102 can connect to a network. Accordingly, a base station is intended to encompass one or more base transceiver stations ("BTSs"), one or more NBs, one or more eNBs (e.g., the eNB 106), one or more home eNBs, one or more wireless access points ("APs"), one or more multi-standard metro cell ("MSMC") nodes, and/or other networking nodes or combinations thereof that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves to and from one or more devices, such as the UEs 102.

The RAN 104 is shown as being in communication with an evolved packet core ("EPC") network 108. The EPC network 108 provides core network functions in accordance with Third Generation Partnership Project ("3GPP") standards specifications. Accordingly, the EPC network 108 can include a plurality of EPC network elements ("EPC network elements") 110, such as, for example, one or more mobility management entity ("MMEs"), one or more home subscriber servers ("HSSs"), one or more serving gateways ("SGWs"), one or more packet data network ("PDN") gateways ("PGWs"), one or more combination SGW/PGWs, one or more policy and charging rules functions ("PCRFs"), some combination thereof, and/or the like.

The EPC network elements 110 can be provided, at least in part, by physical network functions ("PNFs") having hardware and software components that facilitate voice and/or data communications with the UEs 102 and/or other devices (not shown). The EPC network elements 110 can additionally or alternatively be provided, at least in part, by virtual network functions ("VNFs"). For example, the EPC network elements 110 can be realized as VNFs that utilize a unified commercial-off-the-shelf ("COTS") hardware and flexible resources shared model with the application software for the respective EPC network elements running on one or more virtual machines ("VMs"). An example network functions virtualization platform ("NFVP") architecture that might be used to implement at least a portion of the EPC network elements 110 as VNFs is described herein below with reference to FIG. 8.

An MME operating within the EPC network 108 can be configured in accordance with 3GPP standards specifications. An MME, in general, can perform operations to control signaling traffic related to mobility and security for access to the RAN 104.

An SGW can be configured in accordance with 3GPP standards specifications. An SGW provides a point of interconnect between the radio-side (e.g., the RAN 104) and the EPC network 108. An SGW serves the UEs 102 by routing incoming and outgoing IP packets. A PGW can be configured in accordance with 3GPP standards specifications. A PGW interconnects the EPC network 108 and one or more external IP networks, such as, in the illustrated embodiment, one or more other networks 112. The other network(s) 112 can include other public land mobile networks ("PLMNs"), PDNs, circuit-switched networks, operator IP service networks (e.g., IP multimedia subsystem), combinations thereof, and/or the like.

A PGW routes IP packets to and from the other network(s) 112. A PGW also performs operations such as IP address/IP prefix allocation, policy control, and charging. In some implementations, a PGW and an SGW are deployed as independent network components, and in other implementations as a combined network component offering functionality of both a PGW and an SGW.

An HSS can be configured in accordance with 3GPP standards specifications. An HSS is a database that contains user-related information for users of devices, such as the UEs 102. An HSS can provide support functions to one or more MMEs for mobility management, call and session setup, user authentication, and access authorization.

A PCRF can be configured in accordance with 3GPP standards specifications. A PCRF can determine policy rules, detect service data flows, enforce policies, and perform flow-based charging.

The illustrated EPC network 108 additionally includes a plurality of DIAMETER resources ("DIAMETER resources") 114. The DIAMETER resources 114 can include a plurality of DIAMETER nodes that implement the DIAMETER protocol. The DIAMETER protocol is an AAA protocol that works on the application layer of the OSI model. DIAMETER is a message-based protocol, whereby end points exchange messages and receive positive or negative acknowledgements. DIAMETER protocol is well-documented in technical specifications such as those available from the IETF, particularly RFC 6733 and related documents.

Figure 2:
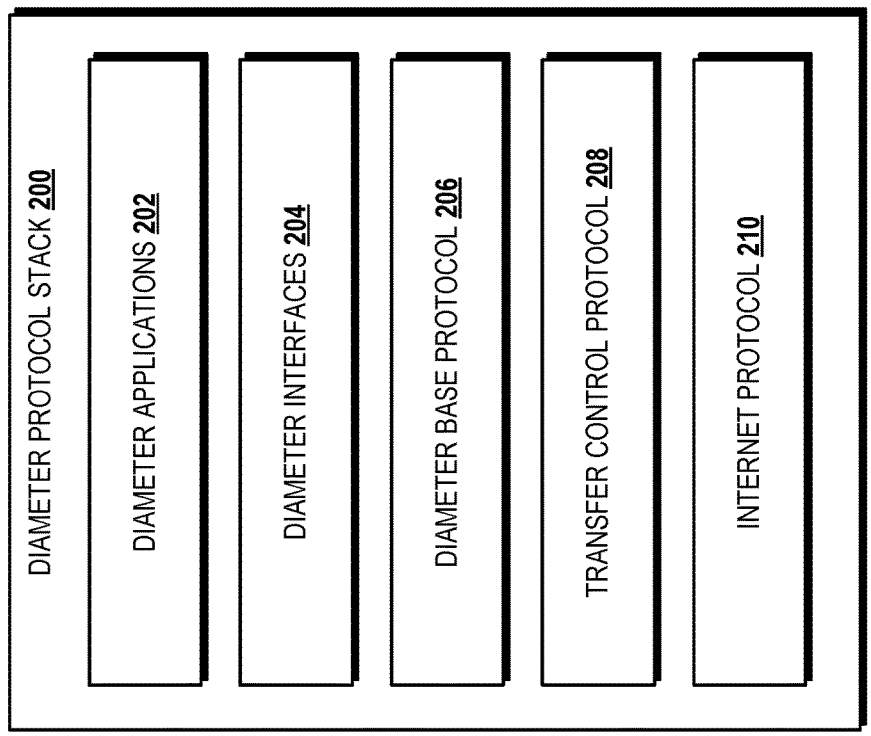
FIG. 2 is a block diagram illustrating a DIAMETER protocol stack capable of being utilized to implement aspects of the embodiments presented herein.

Referring briefly to FIG. 2, a block diagram illustrating an illustrative DIAMETER protocol stack 200 capable of being utilized to implement aspects of the embodiments presented herein will be described. The DIAMETER protocol stack 200 includes DIAMETER applications 202, DIAMETER interfaces 204, DIAMETER base protocol 206, transfer/transmission control protocol ("TCP") 208, and Internet protocol ("IP") 210.

The IP 210 is a low-level network protocol that is used for the addressing and routing of packets through data networks. The IP 210 utilizes routing information and does not utilize data confirmation rules. To ensure reliable data transfer using the IP 210, higher level protocols such as the TCP 208 are used. The IP 210 can be implemented in accordance with the specification set forth in RFC-791 and related documents. The IP 210 defines the packet datagrams that hold packet delivery addressing, type of service specification, dividing and re-assembly of long data files and data security.

The TCP 208 is a transport layer protocol that coordinates the transmission, reception, and retransmission of packets in a data network to ensure reliable (i.e., confirmed) communication. The TCP 208 coordinates the division of data information into packets, adds sequence and flow control information to the packets, and coordinates the confirmation and retransmission of packets that are lost during a communication session. The TCP 208 utilizes the IP 210 as the network layer protocol. The TCP 208 can be implemented in accordance with the specification set forth in RFC-793 and related documents.

The DIAMETER base protocol 206 provides an AAA framework for applications such as network IP mobility in both local and roaming scenarios. The DIAMETER base protocol 206 specifies how DIAMETER nodes are to exchange messages and to deliver attribute-value pairs ("AVPs"). The DIAMETER base protocol 206 specifies the procedure for capabilities negotiation and error notification. The DIAMETER base protocol 206 provides basics services that can be called via an application programming interface ("API") by the DIAMETER applications 202. The DIAMETER base protocol 206 can be implemented in accordance with the specification set forth in RRC-6733 and related documents.

The DIAMETER interfaces 204 provide connections between DIAMETER nodes to enable functions related to AAA for services. The DIAMETER interfaces 204 can include, by way of example, one or more of the following interfaces: S6a, S6b, S6c, S6d, S9, S13, S13, SLg, Gx, Gy, Gz, Gi, SGi, Sp, Rx, Rx+, and Wm. The DIAMETER interfaces 204 can include other interfaces not explicitly mentioned herein, and can include, for example, interfaces later defined. It should be understood that not all interfaces will be utilized in a given DIAMETER session. Some of the more commonly used DIAMETER interfaces will now be described in greater detail below.

The interface S6a lies between an HSS and an MME for authentication and authorization. The interface S6a can transport subscriber-related data, location information, and authentication/authorization information between the HSS and the MME.

The interface SLg lies between an MME and a gateway mobility location center ("GMLC"). The interface SLg enables transfer of location information from the GMLC to the MME.

The interface Gx lies between a PCRF and a policy control and enforcement function ("PCEF"). The interface Gx enables transfer of QoS policy and charging rules from the PCRF to the PCEF.

The interface Rx lies between an application function and a PCRF. The interface Rx enables QoS functions.

The DIAMETER applications 202 extend the functionality provided by the DIAMETER base protocol 206 by adding new commands and/or attributes and calling the DIAMETER base protocol 206 API. The DIAMETER applications 202 can be proprietary applications or standardized applications, such as those found in RFC-4004, RFC-4005, RFC-4006, RFC-4072, RFC-4740, and RFC-5447, for example.

Returning to FIG. 1, the DIAMETER nodes of the DIAMETER resources 114 can implement the DIAMETER protocol and can act as a DIAMETER agent, a DIAMETER client, or a DIAMETER server. A DIAMETER agent is a DIAMETER node that provides relay, proxy, redirect, or translation functions.

A DIAMETER client is a DIAMETER node that supports DIAMETER client applications and the DIAMETER base protocol. DIAMETER clients can be implemented, for example, at the network edge and can provide access control services for the network. Some examples of DIAMETER clients include network access servers and mobile IP foreign agents.

A DIAMETER server is a DIAMETER node that handles authentication, authorization, and accounting requests for a particular realm. A DIAMETER server supports DIAMETER server applications and the DIAMETER base protocol.

A DIAMETER relay agent relays forward requests and responses based on routing-related AVPs and routing table entries. Since DIAMETER relay agents do not make policy decisions, these agents do not examine or alter non-routing AVPs. As a result, DIAMETER relay agents never originate messages, do not need to understand the semantics of messages or non-routing AVPs, and are capable of handling any DIAMETER application or message type. Moreover, since DIAMETER relay agents make decisions based on information in routing AVPs and forwarding tables, these agents do not maintain state on NAS resource usage or sessions in progress.

A DIAMETER proxy agent can perform operations similar to a DIAMETER relay agent. In addition, DIAMETER proxy agents can make policy decisions relating to resource usage and provisioning. DIAMETER proxy agents can make these decisions by tracking the state of NAS devices. While DIAMETER proxy agents do not respond to DIAMETER client requests prior to receiving a response from a DIAMETER server, DIAMETER proxy agents can issue reject messages in cases where policies are violated. As such, DIAMETER proxy agents are designed to understand the semantics of passing messages, and might not support all DIAMETER applications.

A DIAMETER redirect agent does not forward requests and responses between DIAMETER clients and DIAMETER servers, and instead redirects DIAMETER client and DIAMETER servers to allow direct communications between client/server. DIAMETER redirect agents do not alter AVPs exchanged between DIAMETER clients and DIAMETER servers. DIAMETER redirect agents also do not originate messages and are capable of handling any message type. Like DIAMETER relay agents, DIAMETER redirect agents do not maintain state on NAS resource usage or sessions in progress.

A DIAMETER translation agent is a stateful DIAMETER node that performs protocol translation between AAA protocols. For example, a DIAMETER translation agent can perform protocol translation between DIAMETER and another AAA protocol, such as RADIUS.

A DIAMETER peer is a DIAMETER node to which another DIAMETER node has a direct transport connection. The illustrated EPC network 108 additionally includes a plurality of transport resources 116 capable of supporting transport connections between DIAMETER peers. The transport connection operates according to transfer control protocol ("TCP") or stream control transfer protocol ("SCTP"). Two DIAMETER nodes that share a direct TCP or SCTP transport connection are referred to herein as DIAMETER peers.

The DIAMETER resources 114 can additionally include one or more DIAMETER routing agents ("DRAs"). A DRA is a specialized DIAMETER relay agent designed in accordance with 3GPP standards specifications. A DRA is a functional element in a 3G or 4G (e.g., LTE) network that provides real-time routing capabilities to ensure that messages are routed among the correct elements within a network. DRAs were introduced by the 3GPP to address the increased DIAMETER signaling traffic and growing complexity of 4G LTE networks. A DRA can provide real-time routing capabilities to ensure that DIAMETER signaling messages are routed to the correct resources in the EPC network 108.

The DIAMETER resources 114 can additionally include one or more DIAMETER edge agents ("DEAs"). A DEA is a specialized DIAMETER client designed in accordance with 3GPP standards specifications. A DEA provides a point of contact into and out of the EPC network 108 at the DIAMETER application level. A DEA provides secure communications to connect the EPC network 108 to the other network(s) 112 to facilitate internetwork signaling operations (e.g., roaming, charging, and billing), for example, between home and visited PLMNs. A DEA can enable DIAMETER signaling traffic to flow core networks while also disguising the topology of the core networks to one another.

The DIAMETER resources 114 can be virtualized resources that utilize a unified COTS hardware and flexible resources shared model with the application software for the respective DIAMETER resources running on one or more VMs. An example NFVP architecture that might be used to implement at least a portion of the DIAMETER resources 114 is described herein below with reference to FIG. 8.

The EPC network 108 additionally includes a universal DIAMETER orchestrator 118. The universal DIAMETER orchestrator 118 can include one or more processors that can execute instructions contained in a decision logic 120 to perform various functions. In particular, the universal DIAMETER orchestrator 118 can map all of the DIAMETER resources 114 available in the EPC network 108. The universal DIAMETER orchestrator 118 can dynamically select DIAMETER peer nodes for routing control plane transactions on a particular signaling interface with a given service. The universal DIAMETER orchestrator 118 can allocate the transport resources 116 on-demand for intelligently routing DIAMETER application signaling traffic between the two selected DIAMETER peer nodes through a DIAMETER agent within the EPC network 108. The universal DIAMETER orchestrator 118 can enforce rules 122 on-demand to override traditional DRA-based routing with direct DIAMETER peering to accelerate completion of certain transactions for a given prioritized service type that requires higher QoS or to maintain accordance with a service level agreement. The universal DIAMETER orchestrator 118 can consider the session/transaction based application signaling traffic priority based on the source and destination peer nodes that need to communicate to perform a specific transaction and a pair of transactions required for a given service. The universal DIAMETER orchestrator 118 can analyze the DIAMETER protocol stack 200 (described above with reference to FIG. 2) to ensure that the transport resources 116 are optimally allocated to meet the transaction exchange on a service level basis. The universal DIAMETER orchestrator 118 can create a mapping of critical transaction completion times and hysteresis of the DIAMETER resources 114 used to meet such metrics for predictive allocation. The universal DIAMETER orchestrator 118 can monitor signaling traffic exchange, create a structured representation of DIAMETER application data, and can present this data in a standardized format, such as, for example, JSON, for easier integration with network analytics engines. The universal DIAMETER orchestrator 118 can distribute user data transfer capability over DIAMETER applications across multiple DIAMETER peer nodes so as to saturate a given DIAMETER peer node pair. The universal DIAMETER orchestrator 118 can perform real-time configuration management of the transport resources 116 across regional pools with multi-vendor systems. The universal DIAMETER orchestrator 118 can perform real-time performance management of transport resources 116 across regional pools with multi-vendor systems. The universal DIAMETER orchestrator 118 can perform real-time performance management of DIAMETER signaling exchanges over the allocated transport resources 116 per transaction per service type across regional pools with multi-vendor systems. The universal DIAMETER orchestrator 118 can provide a dashboard that outputs service-based analytics in a closed-loop manner to isolate faults and to reroute traffic to maintain transaction continuity.

The illustrated operating environment 100 also illustrates the UEs 102 being capable of utilizing one or more services 124A-124N (referred to herein collectively as services 124, or in the singular form as service 124). The services 124 can include, for example, video, social network, social media, Voice over Long-Term Evolution ("VoLTE"), e-commerce, multimedia, and messaging. The UE 102 can execute one or more service applications 126A-126N (referred to herein collectively as service applications 126, or in the singular form as service application 126) to utilize the services 124. A service application 126 can include, in one embodiment, a web browser application that allows users to access web portals, link pages, web sites, and/or other information available on the World Wide Web. In some other embodiments, the service application 126 can include a native application that is installed on the UE 102 and allows the UE 102 to utilize one or more services 124. The service applications 126A-126N can generate service requests 128A-128N, respectively, and can send the service requests 128A-128N (referred to herein collectively as service requests 128, or in the singular form as service request 128) to the EPC network 108 via the RAN 104. The universal DIAMETER orchestrator 118 can inspect the service requests 128, and utilize the decision logic 120 and rules 122 to determine how to set up the DIAMETER resources 114 and the transport resources 116 to meet signaling requirements of the services identified in the service requests 128.

Figure 3:
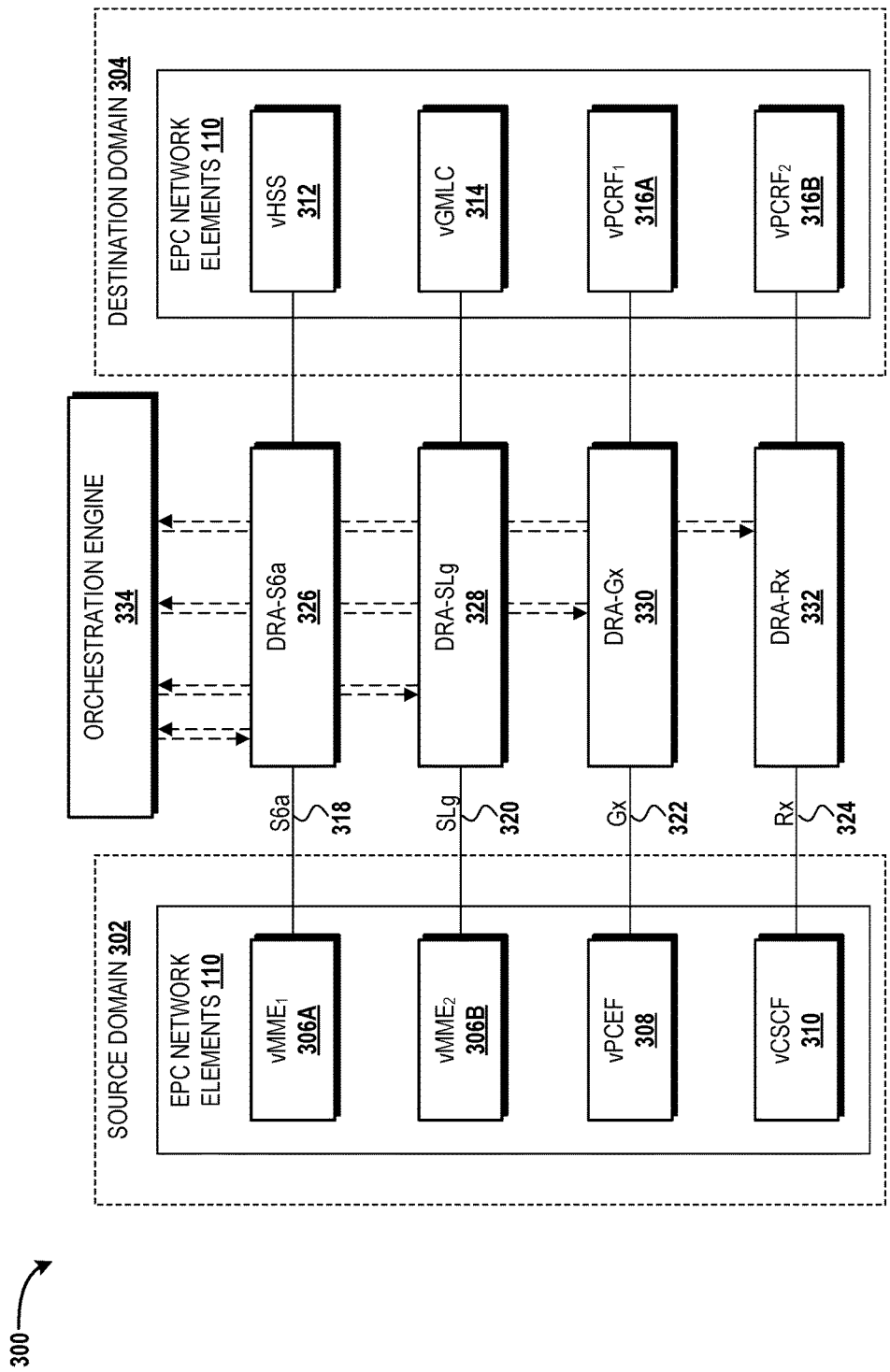
FIG. 3 is a block diagram illustrating a traditional configuration for DIAMETER orchestration in accordance with prior implementations.

Turning now to FIG. 3, a block diagram illustrating a traditional configuration 300 for DIAMETER orchestration in accordance with prior implementations will be described. In the illustrated configuration 300, a source domain 302 and a destination domain 304 in which at least a portion of the EPC network elements 110 from FIG. 1 are illustrated. The EPC network elements 110 shown in FIG. 3 are implemented as VNFs, including vMMEs 306A-306B, a vPCEF 308, a vCSCF 310, a vHSS 312, a vGMLC 314, and vPCRFs 316A-316B.

The $vMME_1$ 306A is shown as being in communication with the vHSS 312 via an S6a DIAMETER interface 318 for handling DIAMETER signaling traffic between these VNFs. The $vMME_2$ 306B is shown as being in communication with the vGMLC 314 via an SLg DIAMETER interface 320 for handling DIAMETER signaling traffic between these VNFs. The vPCEF 308 is shown as being in communication with the $vPCRF_1$ 316A via a Gx DIAMETER interface 322 for handling DIAMETER signaling traffic between these VNFs. The vCSCF 310 is shown as being in communication with the vPCRF2 316B via an Rx DIAMETER interface 324 for handling DIAMETER signaling traffic between these VNFs.

The illustrated configuration 300 also includes a dedicated DRA for each of the aforementioned interfaces. In particular, DIAMETER signaling traffic over the S6a DIAMETER interface 318 can be routed by a DRA-S6a 326; DIAMETER signaling traffic over the SLg DIAMETER interface 320 can be routed by a DRA-SLg 328; DIAMETER signaling traffic over the Gx DIAMETER interface 322 can be routed by a DRA-Gx 330; and DIAMETER signaling traffic over the Rx DIAMETER interface 324 can be routed by a DRA-Rx 332. Each of the dedicated DRAs 326-332 can send individual DIAMETER signaling traffic requests in an ad-hoc fashion to an orchestration engine 334. The orchestration engine 334 determines overall resources assignment in response to the requests and responds accordingly with the allocations. By actively monitoring these resource allocations and/or de-allocations, the orchestration engine 334 maintains a current view of the overall resources required to support transactional exchanges between any two peer nodes in the EPC network 108 to support a given service.

Figure 4:
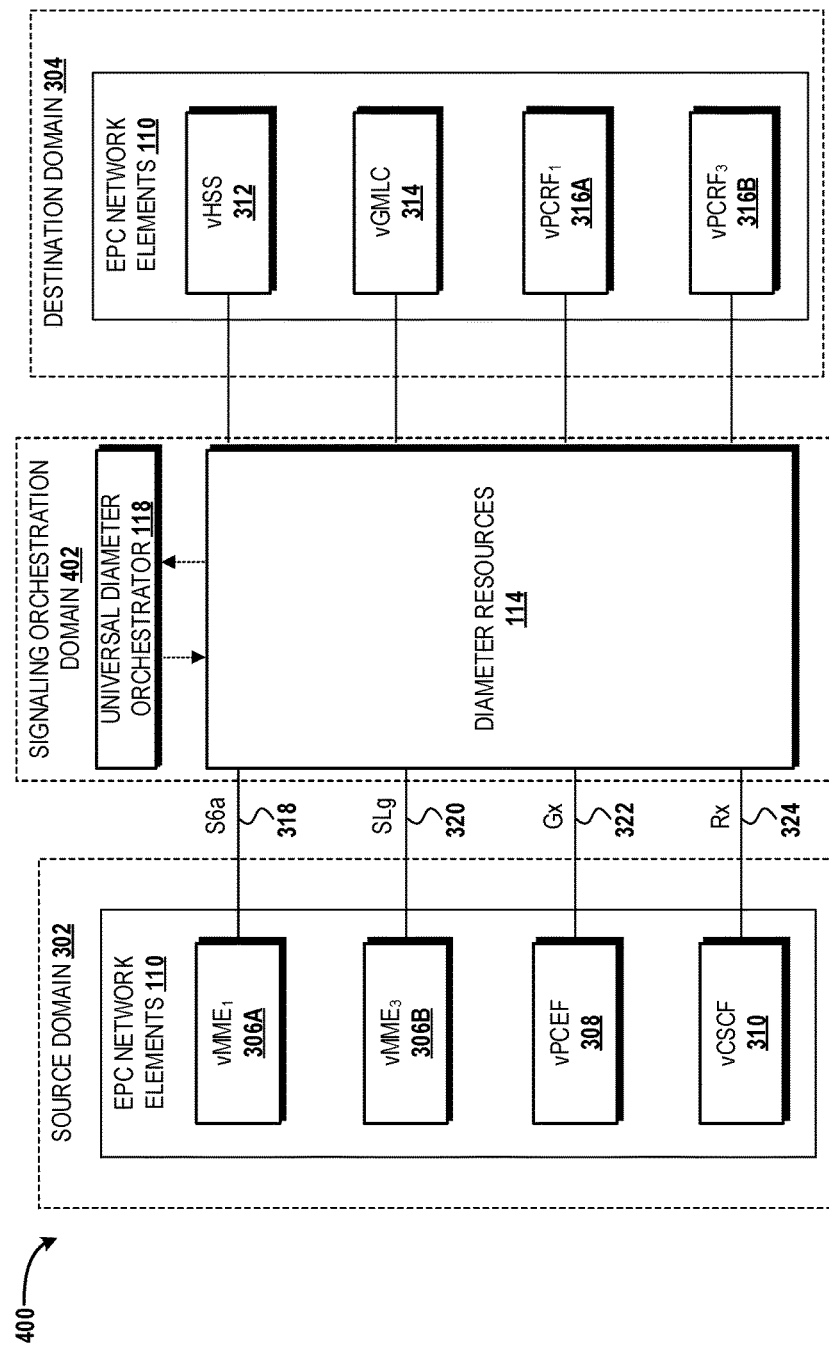
FIG. 4 is a block diagram illustrating a configuration for DIAMETER orchestration, according to an illustrative embodiment.

Turning now to FIG. 4, a block diagram illustrating a configuration 400 for DIAMETER orchestration will be described, according to an illustrative embodiment. In the illustrated configuration 400, the source domain 302 and the destination domain 304 from FIG. 3 are duplicated. The EPC network elements 110 shown in FIG. 4 are implemented as VNFs, including the vMMEs 306A-306B, the vPCEF 308, the vCSCF 310, the vHSS 312, the vGMLC 314, and the vPCRFs 316A-316B.

The $vMME_1$ 306A is shown as being in communication with the vHSS 312 via the S6a DIAMETER interface 318 for handling DIAMETER signaling traffic between these VNFs. The $vMME_2$ 306B is shown as being in communication with the vGMLC 314 via the SLg DIAMETER interface 320 for handling DIAMETER signaling traffic between these VNFs. The vPCEF 308 is shown as being in communication with the $vPCRF_1$ 316A via the Gx DIAMETER interface 322 for handling DIAMETER signaling traffic between these VNFs. The vCSCF 310 is shown as being in communication with the vPCRF2 316B via the Rx DIAMETER interface 324 for handling DIAMETER signaling traffic between these VNFs.

The illustrated configuration 400 also includes a signaling orchestration domain 402 in which the universal DIAMETER orchestrator 118 and the DIAMETER resources 114 described above with reference to FIG. 1 reside. The universal DIAMETER orchestrator 118 can receive a service request 128 (shown in FIG. 1), identify the service 124 requested, identify the DIAMETER peer nodes operating in the source domain 302 and the destination domain 304 required to support DIAMETER signaling traffic associated with providing the service 124 identified in the service request 128, and can allocate at least a portion of the DIAMETER resources 114 needed to support the DIAMETER signaling traffic.

For example, if a non-IP LTE capable M2M type communication device used for IoT service delivery has been in sleep mode for a long time to preserve battery/power and needs to wake up to send/receive data from an external IoT server, the device can setup a non-IP PDN connection on a new 3GPP-defined T6a DIAMETER interface between an MME and a service capability exposure function ("SCEF"). The universal DIAMETER orchestrator 118 can dynamically allocate the resources for such non-IP PDN connections on-demand over the T6a DIAMETER interface to ensure that transactions are completed successfully. In a similar manner, for large scale traffic handling from IoT devices serving across multiple industry verticals, the universal DIAMETER orchestrator 118 can dynamically allocate/de-allocate resources to establish/teardown PDN connections on-demand and to ensure that resources across the peers are maintained at healthy levels to avoid any potential failure scenarios that could otherwise result in network outage and/or malfunctioning in stormy or disaster type situations.

Figure 5:
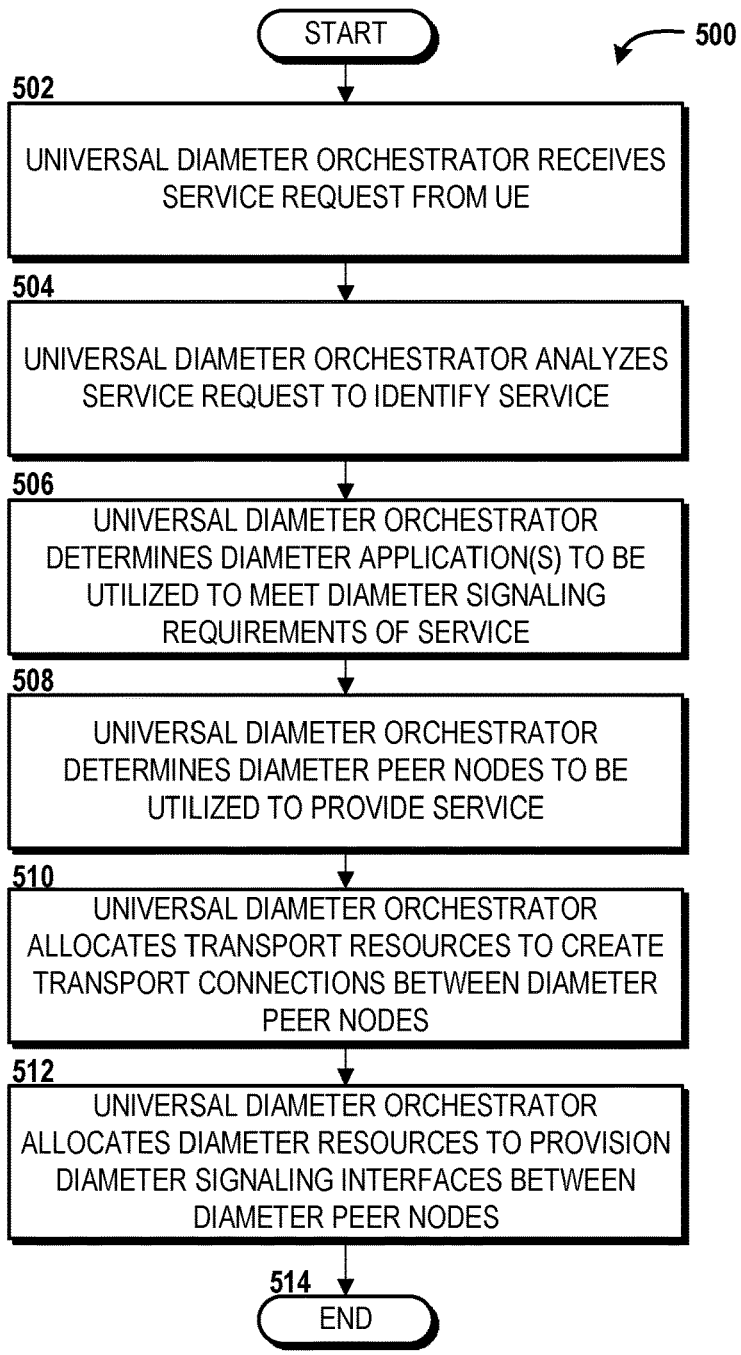
FIG. 5 is a block diagram illustrating a method for DIAMETER orchestration, according to an illustrative embodiment.

Turning now to FIG. 5, aspects of a method 500 for DIAMETER orchestration will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors disclosed herein to perform operations.

For purposes of illustrating and describing some of the concepts of the present disclosure, the method 500 is described as being performed, at least in part, by the universal DIAMETER orchestrator 118 via execution of one or more software modules, such as the decision logic 120. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 500 will be described with reference to FIG. 5 and further reference to FIGS. 1 and 4. The method 500 begins at operation 502, where the universal DIAMETER orchestrator 118 receives the service request 128 from the UE 102. From operation 502, the method 500 proceeds to operation 504, where the universal DIAMETER orchestrator 118 analyzes the service request 128 to identify the service 124 requested. From operation 504, the method 500 proceeds to operation 506, where the universal DIAMETER orchestrator 118 determines one or more DIAMETER applications to be utilized to meet DIAMETER signaling requirements of the service 124.

From operation 506, the method 500 proceeds to operation 508, where the universal DIAMETER orchestrator 118 determines the DIAMETER peer nodes to be utilized to provide the service 124. From operation 508, the method 500 proceeds to operation 510, where the universal DIAMETER orchestrator 118 allocates at least a portion of the transport resources 116 over which to create one or more transport connections between DIAMETER peer nodes.

From operation 510, the method 500 proceeds to operation 512, where the universal DIAMETER orchestrator 118 allocates at least a portion of the DIAMETER resources 114 to provision one or more DIAMETER signaling interfaces between the DIAMETER peer nodes. From operation 512, the method 500 proceeds to operation 514, where the method 500 ends.

Figure 6:
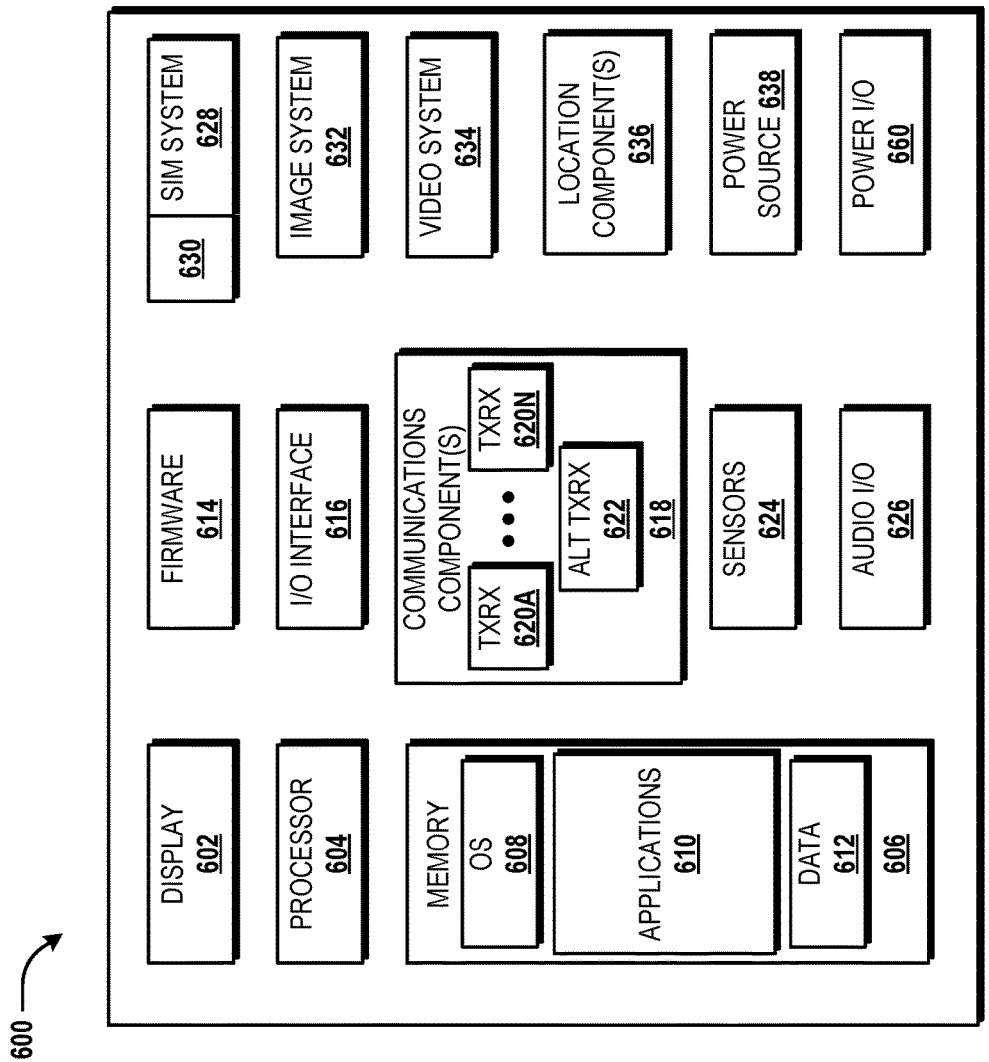
FIG. 6 is a block diagram illustrating an example mobile device capable of implementing aspects of the embodiments disclosed herein.

Turning now to FIG. 6, an illustrative mobile device 600 and components thereof will be described. In some embodiments, one or more of the UEs 102 (shown in FIG. 1) can be configured like the mobile device 600. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610, other computer-executable instructions stored in a memory 606, or the like. In some embodiments, the applications 610 also can include a user interface ("UP") application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The other applications 610 can include the service application 126. The data 612 can include, for example, one or more identifiers, and/or other applications or program modules. According to various embodiments, the data 612 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RHO port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMA ONE, CDMA2000, LTE, and various other 2G, 2.5G, 3G, 4G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), ZIGBEE, other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 660. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
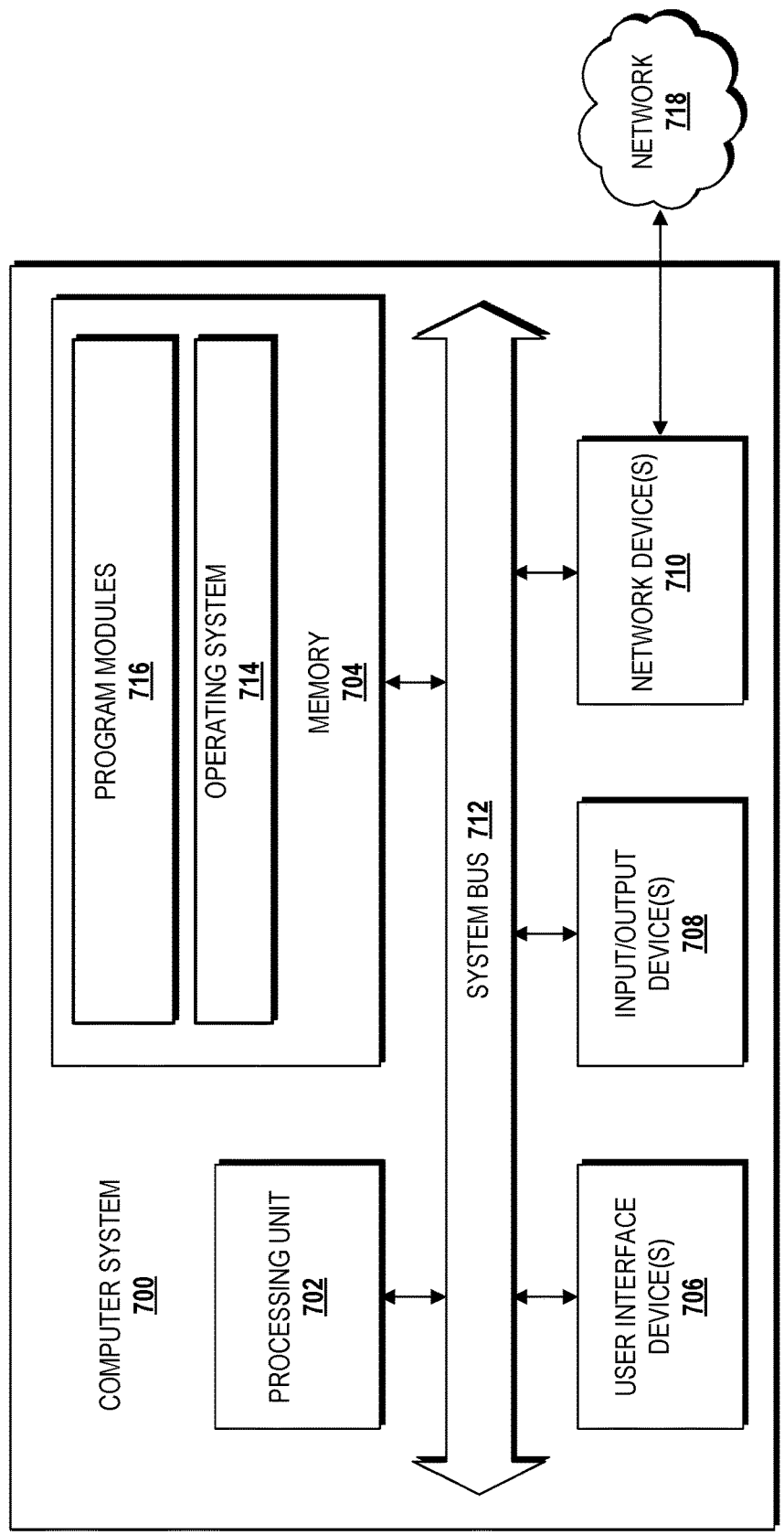
FIG. 7 is a block diagram illustrating an example computer system capable of implementing aspects of the embodiments presented herein.

Turning now to FIG. 7, a block diagram illustrating a computer system 700 configured to provide the functionality in accordance with various embodiments of the concepts and technologies disclosed herein is illustrated. The systems, devices, and other components disclosed herein can utilize, at least in part, an architecture that is the same as or at least similar to the architecture of the computer system 700, for example, the UEs 102, the eNBs 106, the EPC network elements, 110, and/or the universal DIAMETER orchestrator 118. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The system bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 704 communicates with the processing unit 702 via the system bus 712. In some embodiments, the memory 704 is operatively connected to a memory controller (not shown) that enables communication with the processing unit 702 via the system bus 712. The illustrated memory 704 includes an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via a network 718. Examples of the network devices 710 include, but are not limited to, a modem, a radio frequency ("RF") or infrared ("IR") transceiver, a telephonic interface, a bridge, a router, or a network card. The network 718 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 718 may be or may include a wired network such as, but not limited to, a Wide Area Network ("WAN"), a wired Personal Area Network ("PAN"), or a wired Metropolitan Area Network ("MAN").

Figure 8:
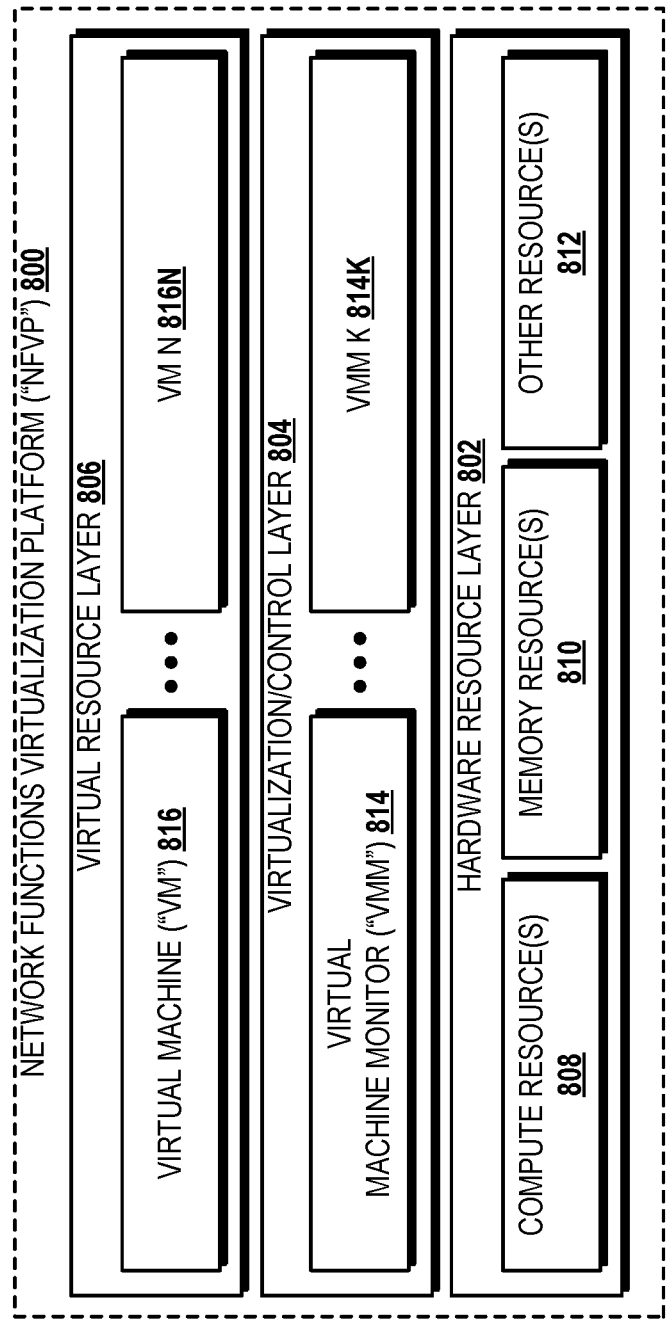
FIG. 8 is a block diagram illustrating an example network functions virtualization platform ("NFVP") capable of implementing aspects of the embodiments presented herein.

Turning now to FIG. 8, a network functions virtualization platform ("NFVP") 800 will be described, according to an exemplary embodiment. The architecture of the NFVP 800 can be used to implement VNFs of the PNFs disclosed herein. For example, the NFVP 800 can be utilized to implement at least a portion of the EPC network elements 110. The NFVP 800 additionally or alternatively can be utilized to implement the universal DIAMETER orchestrator 118. The NFVP 800 additionally or alternatively can be utilized to implement at least a portion of the DIAMETER resources 114 and/or the transport resources 116.

The NFVP 800 is a shared infrastructure that can support multiple services and network applications. The illustrated NFVP 800 includes a hardware resource layer 802, a virtualization/control layer 804, and a virtual resource layer 806 that work together to perform operations as will be described in detail herein.

The hardware resource layer 802 provides hardware resources, which, in the illustrated embodiment, include one or more compute resources 808, one or more memory resources 810, and one or more other resources 812. The compute resource(s) 808 can include one or more hardware components that perform computations to process data, and/or to execute computer-executable instructions of one or more application programs, operating systems, and/or other software. The compute resources 808 can include one or more central processing units ("CPUs") configured with one or more processing cores. The compute resources 808 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 808 can include one or more discrete GPUs. In some other embodiments, the compute resources 808 can include CPU and GPU components that are configured in accordance with a co-processing CPU/GPU computing model, wherein the sequential part of an application executes on the CPU and the computationally-intensive part is accelerated by the GPU. The compute resources 808 can include one or more system-on-chip ("SoC") components along with one or more other components, including, for example, one or more of the memory resources 810, and/or one or more of the other resources 812. In some embodiments, the compute resources 808 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 808 can be or can include one or more hardware components architected in accordance with an ARM architecture, available for license from ARM HOLDINGS of Cambridge, United Kingdom. Alternatively, the compute resources 808 can be or can include one or more hardware components architected in accordance with an x86 architecture, such an architecture available from INTEL CORPORATION of Mountain View, Calif., and others. Those skilled in the art will appreciate the implementation of the compute resources 808 can utilize various computation architectures, and as such, the compute resources 808 should not be construed as being limited to any particular computation architecture or combination of computation architectures, including those explicitly disclosed herein.

The memory resource(s) 810 can include one or more hardware components that perform storage operations, including temporary or permanent storage operations. In some embodiments, the memory resource(s) 810 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 808.

The other resource(s) 812 can include any other hardware resources that can be utilized by the compute resources(s) 808 and/or the memory resource(s) 810 to perform operations described herein. The other resource(s) 812 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 802 can be virtualized by one or more virtual machine monitors ("VMMs") 814-814K (also known as "hypervisors"; hereinafter "VMMs 814") operating within the virtualization/control layer 804 to manage one or more virtual resources that reside in the virtual resource layer 806. The VMMs 814 can be or can include software, firmware, and/or hardware that alone or in combination with other software, firmware, and/or hardware, manages one or more virtual resources operating within the virtual resource layer 806.

The virtual resources operating within the virtual resource layer 806 can include abstractions of at least a portion of the compute resources 808, the memory resources 810, the other resources 812, or any combination thereof. These abstractions are referred to herein as virtual machines ("VMs"). In the illustrated embodiment, the virtual resource layer 806 includes VMs 816-816N (hereinafter "VMs 816"). Each of the VMs 816 can execute one or more applications.

Based on the foregoing, it should be appreciated that concepts and technologies directed to universal peer-to-peer signaling network virtualization and orchestration have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A universal DIAMETER orchestrator comprising:
a processor; and
a memory that includes instructions that, when executed by the processor, cause the universal DIAMETER orchestrator to perform operations comprising:
receiving, from a user equipment device, a service request specifying a service to be provided to the user equipment device,
analyzing the service request to identify the service to be provided to the user equipment device,
determining DIAMETER peer nodes to be utilized to handle DIAMETER signaling traffic for the service provided to the user equipment device, wherein the DIAMETER peer nodes include at least two DIAMETER nodes within an evolved packet core network that share a direct transport connection between a source domain and a destination domain of the evolved packet core network,
selecting the DIAMETER peer nodes that will handle the DIAMETER signaling traffic for the service over DIAMETER signaling interfaces,
allocating, within the evolved packet core network, transport resources over which the direct transport connection between the DIAMETER peer nodes can be established, and
allocating, within the evolved packet core network, DIAMETER resources to provision the DIAMETER signaling interfaces that handle the DIAMETER signaling traffic between the DIAMETER peer nodes.

2. The universal DIAMETER orchestrator of claim 1, wherein at least one of the at least two DIAMETER nodes corresponds with the source domain of the evolved packet core network and at least one of the at least two DIAMETER nodes corresponds with the destination domain of the evolved packet core network.

3. The universal DIAMETER orchestrator of claim 2, wherein the DIAMETER signaling traffic between the DIAMETER peer nodes is routed through a DIAMETER agent of the DIAMETER resources within the evolved packet core network.

4. The universal DIAMETER orchestrator of claim 3, wherein the operations further comprise determining a DIAMETER application to be utilized to meet a DIAMETER signaling requirement of the service.

5. The universal DIAMETER orchestrator of claim 4, wherein the operations further comprise:
creating a structured representation of DIAMETER application data associated with the DIAMETER application; and
reporting the structured representation.

6. The universal DIAMETER orchestrator of claim 4, wherein the operations further comprise analyzing a structured DIAMETER protocol stack at a DIAMETER application layer upon which the DIAMETER application operates, a transport layer, and an IP layer to ensure that the transport resources are allocated to meet the DIAMETER signaling requirement for the service.

7. The universal DIAMETER orchestrator of claim 1, wherein the operations further comprise mapping the DIAMETER resources available in a network designed to provide the service.

8. The universal DIAMETER orchestrator of claim 1, wherein allocating the transport resources comprises allocating the transport resources on-demand.

9. The universal DIAMETER orchestrator of claim 1, wherein allocating the DIAMETER resources comprises allocating the DIAMETER resources in accordance with a rule to override a traditional DIAMETER routing agent.

10. A computer-readable storage medium having instructions of a universal DIAMETER orchestrator stored thereon that, when executed by a processor, cause the universal DIAMETER orchestrator to perform operations comprising:
receiving, from a user equipment device, a service request specifying a service to be provided to the user equipment device;
analyzing the service request to identify the service to be provided to the user equipment device;
determining DIAMETER peer nodes to be utilized to handle DIAMETER signaling traffic for the service provided to the user equipment device, wherein the DIAMETER peer nodes include at least two DIAMETER nodes within an evolved packet core network that share a direct transport connection between a source domain and a destination domain of the evolved packet core network;
selecting the DIAMETER peer nodes that will handle the DIAMETER signaling traffic for the service over DIAMETER signaling interfaces;
allocating, within the evolved packet core network, transport resources over which the direct transport connection between the DIAMETER peer nodes can be established; and
allocating, within the evolved packet core network, DIAMETER resources to provision the DIAMETER signaling interfaces that handle the DIAMETER signaling traffic between the DIAMETER peer nodes.

11. The computer-readable storage medium of claim 10, wherein at least one of the at least two DIAMETER nodes corresponds with the source domain of the evolved packet core network and at least one of the at least two DIAMETER nodes corresponds with the destination domain of the evolved packet core network.

12. The computer-readable storage medium of claim 11, wherein the DIAMETER signaling traffic between the DIAMETER peer nodes is routed through a DIAMETER agent of the DIAMETER resources within the evolved packet core network.

13. The computer-readable storage medium of claim 12, wherein the operations further comprise determining a DIAMETER application to be utilized to meet a DIAMETER signaling requirement of the service.

14. The computer-readable storage medium of claim 13, wherein the operations further comprise:
creating a structured representation of DIAMETER application data associated with the DIAMETER application; and
reporting the structured representation.

15. The computer-readable storage medium of claim 10, wherein the operations further comprise mapping the DIAMETER resources available in a network designed to provide the service.

16. A method comprising:
receiving, by a universal DIAMETER orchestrator from a user equipment device, a service request specifying a service to be provided to the user equipment device;
analyzing, by the universal DIAMETER orchestrator, the service request to identify the service to be provided to the user equipment device;
determining, by the universal DIAMETER orchestrator, DIAMETER peer nodes to be utilized to handle DIAMETER signaling traffic for the service provided to the user equipment device, wherein the DIAMETER peer nodes include at least two DIAMETER nodes within an evolved packet core network that share a direct transport connection between a source domain and a destination domain of the evolved packet core network;
selecting, by the universal DIAMETER orchestrator, the DIAMETER peer nodes that will handle the DIAMETER signaling traffic for the service over DIAMETER signaling interfaces;
allocating, by the universal DIAMETER orchestrator within the evolved packet core network, transport resources over which the direct transport connection between the DIAMETER peer nodes can be established; and
allocating, by the universal DIAMETER orchestrator within the evolved packet core network, DIAMETER resources to provision the DIAMETER signaling interfaces that handle the DIAMETER signaling traffic between the DIAMETER peer nodes.

17. The method of claim 16, wherein at least one of the at least two DIAMETER nodes correspond with the source domain of the evolved packet core network and at least one of the at least two DIAMETER nodes correspond with the destination domain of the evolved packet core network.

18. The method of claim 17, further comprising determining a DIAMETER application to be utilized to meet a DIAMETER signaling requirement of the service.

19. The method of claim 16, further comprising mapping the DIAMETER resources available in a network designed to provide the service.

20. The method of claim 16, wherein allocating the DIAMETER resources comprises allocating the DIAMETER resources in accordance with a rule to override a traditional DIAMETER routing agent.

* * * * *